United States Patent [19]

Slagsvol

[11] Patent Number: 4,884,826

[45] Date of Patent: Dec. 5, 1989

[54] TRACING PAPER HAVING A REMOVABLE MARGIN OF PRESSURE SENSITIVE ADHESIVE

[76] Inventor: Elizabeth A. Slagsvol, P.O. Box 6495, Columbia, S.C. 29206

[21] Appl. No.: 234,351

[22] Filed: Aug. 19, 1988

[51] Int. Cl.$^{4}$ .......................... B42D 1/00; B42D 5/00; B42D 3/18; B32B 7/00

[52] U.S. Cl. .......................................... 281/2; 281/38; 281/51; 428/40

[58] Field of Search ...................... 281/1, 2, 4, 6, 3 A, 281/8, 38, 901; 428/40

[56] References Cited

U.S. PATENT DOCUMENTS

| | | | |
|---|---|---|---|
| 2,926,025 | 2/1960 | Sormberger | 281/38 |
| 4,471,977 | 9/1984 | Stackhouse | 281/38 |
| 4,545,517 | 10/1985 | Olson | 281/2 |
| 4,551,374 | 11/1985 | Holmberg | 281/2 |
| 4,568,108 | 2/1986 | Simpson | 281/2 |
| 4,618,520 | 10/1986 | Holmberg | 281/2 |
| 4,667,983 | 5/1987 | Spolander | 281/38 |
| 4,705,297 | 11/1987 | Wakeman | 281/2 |
| 4,758,021 | 7/1988 | Fukuda | 281/2 |

FOREIGN PATENT DOCUMENTS

| | | | |
|---|---|---|---|
| 2092520 | 8/1982 | United Kingdom | 281/38 |

*Primary Examiner*—Frank T. Yost
*Assistant Examiner*—Paul M. Heyrana, Sr.
*Attorney, Agent, or Firm*—Pollock, Vande Sande & Priddy

[57] ABSTRACT

A sheet of tracing paper is provided with a removable border which is coated with a layer of a pressure-sensitive adhesive for temporarily securing the tracing paper to an underlying surface. The border is defined on the inner edge thereof by a tear line, which may be a series of perforations, to permit easy separation of the adhesive-coated border from the remainder of the sheet after the tracing is completed.

20 Claims, 1 Drawing Sheet

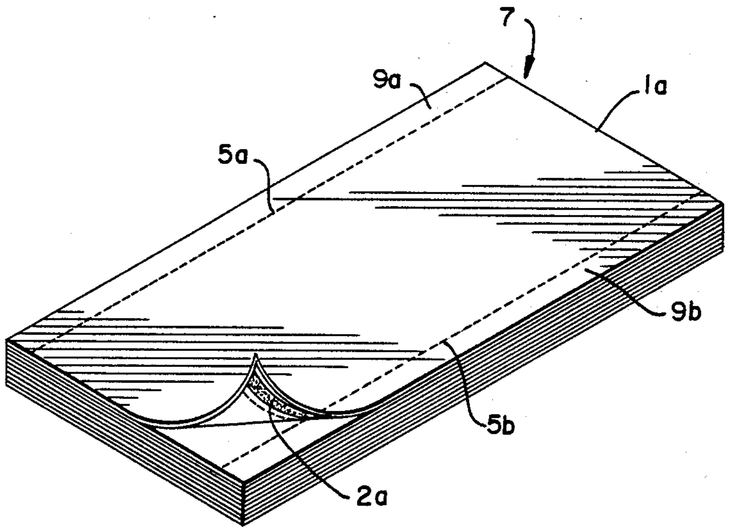
FIG. 1
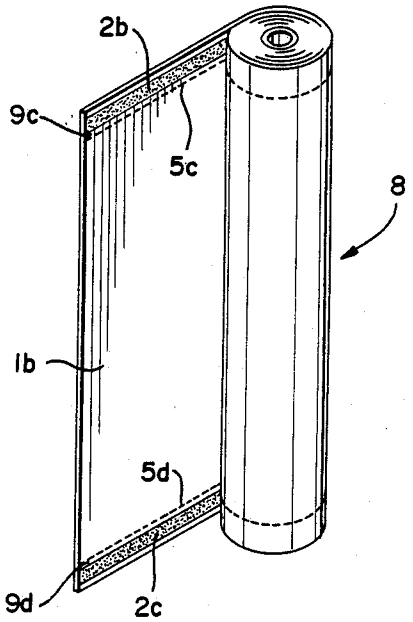
FIG. 2
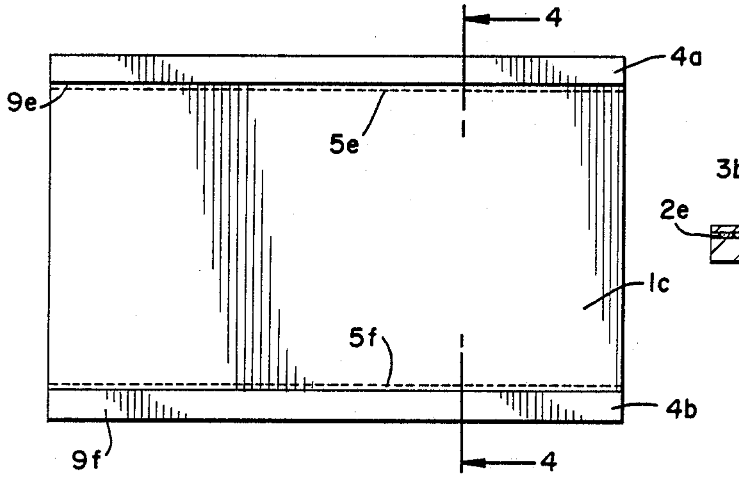
FIG. 3
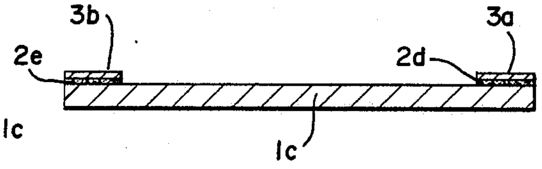
FIG. 4
FIG. 6
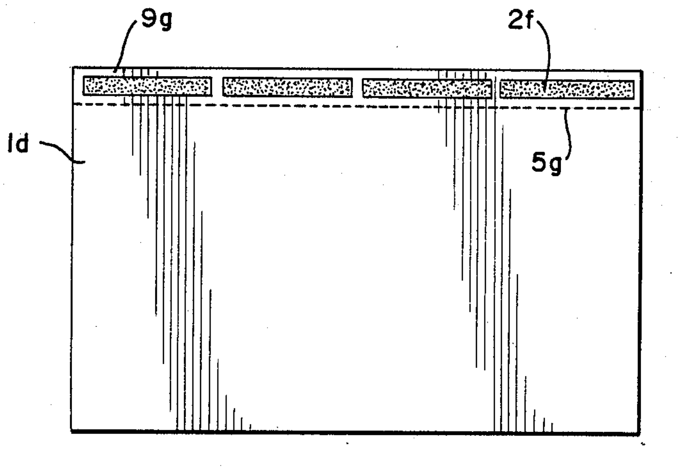
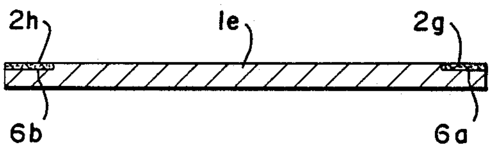
FIG. 5

TRACING PAPER HAVING A REMOVABLE MARGIN OF PRESSURE SENSITIVE ADHESIVE

This invention relates to the graphic arts, and more particularly, to tracing paper for use in duplicating graphic materials such as designs and drawings, or in making new drawings or layouts based at least in part upon the design or drawing on an underlying sheet.

BACKGROUND OF THE INVENTION

Although processes for reproducing drawings, designs and printed matter have shown great advances, there still exists a need to make drawings and copies of some materials by tracing. Tracing is typically performed by placing a sheet of tracing paper over the material to be copied, holding the tracing paper in place by applying a pressure-sensitive tape to four corners or to the top and bottom edges of the tracing paper. The steps of taping the tracing paper in place on the drawing to be reproduced is not only time-consuming, but may result in a loose fit of the tracing paper on the drawing, resulting in an inaccurate tracing. Further, the act of pulling the tape off can tear the corners or the edge and thus produce a tracing sheet which is unprofessional in appearance.

SUMMARY OF THE INVENTION

It is accordingly one object of this invention to provide a tracing paper which overcomes the difficulties encountered in using tape to hold tracing paper in place on an underlying surface.

It is another object of this invention to provide a tracing paper which incorporates an adhesive for holding the tracing paper in place on a surface.

In accordance with this invention, tracing paper is provided which comprises a sheet of translucent material, and a pressure-sensitive adhesive covering at least a portion of the border on one side of the sheet. In the preferred form of the invention, the border is bounded on its inner side by a tear line to permit easy separation of the border from the remainder of the sheet.

Tracing paper made in accordance with this invention can be easily and rapidly applied to and removed from an underlying surface. Further, the tracing paper can be tightly fitted to an underlying surface which is necessary for a highly accurate reproduction of a drawing. When a tear line is present it permits quick and easy separation of the adhesive-coated border from the remainder of the tracing paper.

The tracing paper made in accordance with this invention is useful in the creation of original drawings as well as in the duplication of existing drawings. For example, the tracing paper may be used to show the arrangement of items in relation to a layout shown on an underlying sheet or surface such as the arrangement of furniture in a room, where the room is shown in an underlying layout.

The term "tracing paper" is intended to include tracing sheets made of paper, cloth or other material which permits sufficient light to pass through the sheets to see lines on an underlying surface.

BRIEF DESCRIPTION OF THE DRAWINGS

FIG. 1 is an isometric view of a pad of sheets of tracing paper made in accordance with this invention.

FIG. 2 is an isometric view of a roll of tracing paper made in accordance with this invention.

FIG. 3 is a plan view of one embodiment of this invention.

FIG. 4 is a view in cross-section of FIG. 3 taken along line 4—4.

FIG. 5 is a view in cross-section of an embodiment of this invention wherein the edges are recessed.

FIG. 6 is a plan view of this invention wherein intermittent strips of adhesive are provided at one edge of the tracing paper.

DETAILED DESCRIPTION OF THE INVENTION

FIG. 1 shows a pad 7 of sheets of tracing paper *1a* which are provided with tear lines *5a*, *5b* near opposite edges of the sheets to form borders *9a*, *9b*. Each border is provided with a strip of pressure-sensitive adhesive on the lower side thereof, border *9b* being shown with strip *2a* of pressure-sensitive adhesive.

The tear line is a portion of the tracing paper which has been weakened so that the border can be separated from the rest of the sheet merely by pulling on the border. A weakened line may be formed by making a crease in the appropriate place. However, the tear line preferably comprises a series of perforations spaced so that it is easy to separate the borders *9a*, *9b* from the rest of the sheet of tracing paper. The distance of the tear line from the edges of the paper is not critical; however, the border must be wide enough to provide a sufficient area of pressure sensitive adhesive for the adhesive to hold the tracing paper in place during use. A border from about ½ inch to about 1½ inches wide and an adhesive width from ¼ to ¾ inch wide are preferred.

The pressure-sensitive adhesive must have sufficient adherence to a surface which is to underlie the tracing paper so that it remains in place in typical condition of use, yet it must be readily removable when the tracing paper is lifted. A wide variety of adhesive formulations may be used in practicing this invention and typically useful adhesives are described in U.S. Pat. No. 3,862.,068, issued Jan. 21, 1975 to Russell, U.S. Pat. No. 3,922,464 issued Nov. 25, 1975 to Silver et al, and U.S. Pat. No. 4,294,936 issued Oct. 13, 1981 to Korpman, disclosures of which are hereby incorporated by reference.

The pressure-sensitive adhesive may be a continuous strip as is shown in FIG. 2 or it may consist of intermittent areas of adhesive on the border as is shown in FIG. 6.

As shown in FIG. 2, sheet *1b* of tracing paper is in the form of roll 8 and is provided with tear lines *5c* and *5d*, forming borders which are provided with adhesive strips *2b* and *2c*.

If the tracing paper is provided in single sheets, the adhesive layer is preferably covered with a protective film to prevent the adhesive layers from contacting and sticking to various surfaces with which they may come into contact. As shown in FIGS. 3 and 4, pressure-sensitive strips *2d* and *2e* are protected with film strips *3a*,*3b* to form a combination *4a* and *4b* shown in FIG. 3. The protective strips *3a*, *3b* may be made from a number of different materials and a polyester tape sold under the trade name Mylar is satisfactory.

Protective strips which have been removed to apply the tracing paper to an underlying surface can be reapplied to the adhesive on the tracing paper. This procedure is especially useful with tracing paper which has no tear lines. Alternatively, the adhesive on a sheet which is not provided with tear lines can be protected by placing a coextensive backing sheet over the adhesive-coated side of the tracing paper.

In a preferred embodiment the adhesive layer comprises a strip of a tape having two sides coated with adhesive, one side of which is covered with a protective strip. These double-coated tapes are available commercially and methods of making them are described in U.S. Pat. No. 2,206,899 issued July 9, 1940, and U.S. Pat. No. 2,444,830 issued July 6, 1948, both to Kellgren disclosures of which are hereby incorporated by reference.

The adhesive on the transparent sheets of pad 7 of FIG. 1 and roll 8 of FIG. 2 are well suited for use without a protective strip since the adhesive on each sheet is protected by an underlying layer of tracing paper.

The strip of adhesive and the protective strip, if present, result in an overall thickness at the border greater than the thickness of the sheet in the main body thereof, and this difference in dimensions across the width of the sheet may present problems when the sheet is provided in roll or pad form. Accordingly, this invention contemplates a reduction in the thickness of the border of the tracing paper in order to accommodate the space to be occupied by the adhesive and the protective strip if present. As shown in FIG. 5, sheet 1*e* of tracing paper is provided at the edges thereof with recesses 6*a*, 6*b* which contain adhesive 2*g*, 2*h*. Methods of forming a recess in a sheet of paper, such as by pressing an indentation at the edge thereof for example, are disclosed in U.S. Pat. No. 4,447,481 to Holmberg and the disclosures of that patent are hereby incorporated by reference.

The foregoing is intended to illustrate and describe certain embodiments of the present invention, and changes can readily be made by workers in the art without departing from the scope of the invention which is set forth in the claims which follow.

What is claimed is:

1. Tracing paper for copying graphic material which is present on an underlying surface comprising:

(a) a sheet of translucent material passing sufficient light for copying said graphic material on a surface of said sheet facing away from said underlying surface;

(b) a removable border along at least one edge of said sheet, said border being defined by said at least one edge and a tear line for separting said border from the remainder of said sheet, said tear line being disposed inwardly of and substantially parallel to said at least one edge; and, (c) a pressure-sensitive adhesive covering at least a portion of said border on one side of said sheet for securing said sheet in a fixed position on said underlying surface, said pressure sensitive adhesive on said border permitting repetitive securing of said sheet on and removal of said sheet from said underlying surface, and said tear line providing means for easily separating the pressure sensitive adhesive coated border from the remainder of said sheet when the graphic material has been copied on said sheet.

2. Tracing paper in accordance with claim 1 wherein said pressure sensitive adhesive comprises a substantially continuous strip on said border.

3. Tracing paper in accordance with claim 1 wherein said pressure sensitive adhesive comprises intermittent areas of adhesive within said border.

4. Tracing paper in accordance with claim 1 wherein said adhesive is covered with a pressure sensitive protective removable film.

5. Tracing paper in accordance with claim 1 wherein said pressure sensitive adhesive comprises a strip of tape having two sides coated with a pressure sensitive adhesive.

6. Tracing paper in accordance with claim 1 wherein two opposite edges of said sheet are each provided with a border and said borders are each provided with said pressure sensitive adhesive on the same side of said sheet.

7. Tracing paper in accordance with claim 1 wherein said pressure sensitive adhesive extends from about $\frac{1}{4}$ inch to about $\frac{3}{4}$ inch across the width of said border.

8. Tracing paper in accordance with claim 1 wherein said border is from about $\frac{1}{2}$ inch to about $1\frac{1}{2}$ inches wide.

9. Tracing paper in accordance with claim 1 wherein said sheet comprises an elongated sheet in roll form and said border defined by at least one edge of said sheet and said tear line extends lengthwise of said elongated sheet.

10. A pad of a plurality of sheets of tracing paper for duplicating graphic material on an underlying surface, each of said sheets passing sufficient light for copying said graphic material on a surface of said sheet facing away from said underlying surface and being provided with a removable border along at least one edge thereof, said border being defined by said at least one edge and a tear line for separating said border from the remainder of said sheet, said tear line being disposed inwardly of and substantially parallel to said at least one edge; and, a layer of pressure sensitive adhesive covering at least a portion of one side of said sheet within said border for securing said sheet in a fixed position on said underlying surface, said pressure sensitive adhesive on said border permitting repetitive securing of said sheet on and removal of said sheet from said underlying surface, and said tear line providing means for easily separating the pressure sensitive adhesive coated border from the remainder of said sheet when the graphic material has been copied onto said sheet, said plurality of sheets being stacked and connected together at said borders by said pressure sensitive adhesive layers.

11. Tracing paper for duplicating graphic material which is present on an underlying surface comprising a sheet of translucent material passing sufficient light for copying said graphic material on a surface of said sheet facing away from said underlying surface, said sheet having a plurality of marginal edge portions and strips of a pressure-sensitive adhesive along at least two of said marginal edge portions for securing said sheet in a fixed position on said underlying surface, and said pressure sensitive adhesive permitting repetitive securing of said sheet on and removal of said sheet from said underlying surface.

12. Tracing paper in accordance with claim 11 wherein said at least two marginal edge portions are on opposing edges of said tracing paper.

13. Tracing paper in accordance with claim 11 wherein a tear line is provided inwardly of each of said strips of pressure sensitive adhesive.

14. Tracing paper in accordance with claim 13 wherein each of said tear lines defines a border which is from about $\frac{1}{2}$ inch to about $1\frac{1}{2}$ inches wide.

15. Tracing paper in accordance with claim 11 wherein each of said strips of pressure sensitive adhesive is substantially continuous.

16. Tracing paper in accordance with claim 11 wherein each of said strips of pressure sensitive adhesive comprises intermittent areas of adhesive within a corresponding one of said marginal edge portions.

17. Tracing paper in accordance with claim 11 wherein said pressure sensitive adhesive is covered with a removable protective film.

18. Tracing paper in accordance with claim 11 wherein each of said strips of pressure sensitive adhesive comprises a strip of tape having two sides coated with a pressure sensitive adhesive.

19. Tracing paper in accordance with claim 11 wherein each of said strips of pressure sensitive adhesive extends from about $\frac{1}{4}$ inch to about $\frac{3}{4}$ inch across the width of a corresponding one of said marginal edge portions.

20. Tracing paper in accordance with claim 11 wherein said sheet comprises an elongated sheet in roll form, and said strips of pressure sensitive adhesive extend lengthwise of said elongated sheet.

* * * * *

UNITED STATES PATENT AND TRADEMARK OFFICE

CERTIFICATE OF CORRECTION

PATENT NO. : 4,884,826

DATED : December 5, 1989

INVENTOR(S) : Elizabeth Abraham Slagsvol

It is certified that error appears in the above-identified patent and that said Letters Patent is hereby corrected as shown below:

Column 4, line 2, after "said" insert --pressure sensitive--, and change "pressure sensitive" to --removable--; and line 3, delete "removable".

Signed and Sealed this

Twenty-third Day of October, 1990

Attest:

HARRY F. MANBECK, JR.

Attesting Officer

Commissioner of Patents and Trademarks